(12) United States Patent
Alles et al.

(10) Patent No.: US 6,525,918 B1
(45) Date of Patent: Feb. 25, 2003

(54) ADAPTIVE ARC FAULT DETECTION AND SMART FUSING SYSTEM

(75) Inventors: Sheran Anthony Alles, Westland, MI (US); Shahram Zarei, Farmington Hills, MI (US); Timothy Patrick Diez, Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,507

(22) Filed: Sep. 11, 2001

(51) Int. Cl.[7] .................................................. H02H 3/00
(52) U.S. Cl. ........................................ 361/93.1; 361/87
(58) Field of Search ........................... 361/78, 79, 93.1, 361/93.2, 93.9, 7, 87; 340/511, 517, 522; 307/4.1, 10.1

(56) References Cited

U.S. PATENT DOCUMENTS

| | | | |
|---|---|---|---|
| 4,466,071 A | 8/1984 | Russell, Jr. | |
| 5,121,282 A | 6/1992 | White | |
| 5,185,684 A | 2/1993 | Beihoff et al. | |
| 5,477,150 A | * 12/1995 | Ham et al. | .................. 324/501 |
| 5,706,159 A | * 1/1998 | Dollar et al. | ................ 324/536 |
| 5,835,321 A | 11/1998 | Elms et al. | |
| 5,910,872 A | * 6/1999 | Marmonier et al. | ........... 361/2 |
| 6,088,205 A | 7/2000 | Neiger et al. | |
| 6,141,192 A | * 10/2000 | Garzon | .......................... 361/5 |

* cited by examiner

Primary Examiner—Kim Huynh

(57) ABSTRACT

An adaptive fusing electrical circuit (circuit) including a power supply and an electrical load drawing an electrical current therethrough. The circuit includes a current detector that measures a current level through the circuit. An interruption switch, which is normally closed, is electrically coupled to the electrical load and the current detector having an open state and a closed state. A controller is coupled to the power supply, the current detector, and the switch, the controller monitors the current level and a first circuit parameter of the electrical circuit. The controller interrupts the electrical current by switching the interruption switch from the closed state to the open state when the current level and the first circuit parameter are outside corresponding guard bands.

19 Claims, 4 Drawing Sheets

ADAPTIVE ARC FAULT DETECTION AND SMART FUSING SYSTEM

BACKGROUND OF INVENTION

The present invention relates generally to automotive electrical power systems, and more particularly, to a method and apparatus of adaptive fusing within an electrical circuit.

Various types of multi-voltage level on-board systems have been proposed for automobiles. Typically, the automotive electrical systems use 14 volts. Recently, however, the automotive industry has started to discuss moving to a higher system voltage, such as 42 volts. A higher voltage system is particularly adapted to supply power to high power loads, such as the integrated starter alternator of the vehicle. The use of higher voltages allow the use of lower current for existing electrical loads, and allowing more power to be available for other loads.

Higher voltage systems create increased arcing between switch contacts and terminals upon separation. The severity of the arc increases drastically with increase in voltage. Various drawbacks may also be evident.

In 42-Volt systems, when electrical contacts are separated or brought close together an electrical arc may occur between the contacts, which has a sparl/arc intensity and temperature much more severe as compared with the present 14-Volt systems. Unfortunately, present passive fusing schemes, such as in-line fuses, only protect against an over-current condition and not against most common series or parallel faults caused by arcing between contacts. For example, in the case of loads such as motors and lamps, the fuse element is usually oversized so as to be capable of withstanding the large inrush currents, which is pre-selected based on the usage profiles of these loads. In-line fuses therefore are incapable of protecting against short circuits of very small duration (slow blow) or resistive shorts that do not significantly exceed usual 350% rated current of the fuse to blow quickly, thereby overstressing circuit wires.

Recently, there has been an introduction of an Arc Fault Circuit Interrupter (AFCI), as in U.S. Pat. Nos. 5,835,321 and 5,121,282, based on the detection of a high frequency signal seen during a sustained arc during a showering arc (amplitude varying arc having different frequency components). The frequency detection could be problematic, especially in the case of arcing with inductive or capacitive elements in series, due to filtering of these high frequencies, depending on the location of the arc (after the load). However, for vehicle applications the detection and filtering system is so coarse that the AFCI could falsely trip. A false trip occurs when a fusing technique falsely interrupts current in an electrical circuit when a normal increase in current level occurs for a brief period of time during normal operation. U.S. Pat. No. 5,839,092 looks at rate-of-change of current and polarity in household AC-systems. The system described in patent "092 does not consider duration of the arcs, which is therefore inapplicable for vehicle environments having various components with various normal operating characteristics. During normal operation insignificant arcs may occur, which would cause the patent "092 to interrupt the current. For example, in the case of the main battery supply, a false trip of the fuse would cause the vehicle to loose power.

Therefore, it is desirable to develop a new technique for electrical current interruption. The new technique should be capable of interrupting a circuit during an arc fault while minimizing false tripping. Additionally, the new technique should be capable of adapting to load conditions that it is being used to protect.

SUMMARY OF INVENTION

The forgoing and other advantages are provided by a method and apparatus of adaptive fusing for an electrical circuit. An adaptive fusing electrical circuit including a power supply and an electrical load drawing an electrical current therethrough. The circuit includes a current detector that measures a current level through the circuit. An interruption switch, which is normally closed, is electrically coupled to the electrical load and the current detector having an open state and a closed state. A controller is coupled to the power supply, the current detector, and the switch. The controller monitors the current level and a first circuit parameter of the circuit. The controller has a first guard band corresponding to the current level and a second guard band corresponding to the first circuit parameter. The controller compares the current level to the first guard band and the first circuit parameter to the second guard band. The controller interrupts the electrical current by switching the interruption switch from the closed state to the open state when the current level is outside the first guard band and the first circuit parameter is outside the second guard band.

The present invention has several advantages over existing fusing techniques. One advantage of the present invention is that it provides an improved and reliable adaptive fusing technique. The present invention also interrupts the circuit during an arc fault while minimizing false tripping.

Another advantage of the present invention is that it is capable of adapting to the load conditions that it is being used to protect. In other words, the present invention adapts to aging effect of loads by monitoring current decay rates during normal operating conditions.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of example.

DETAILED DESCRIPTION

Figure 1:
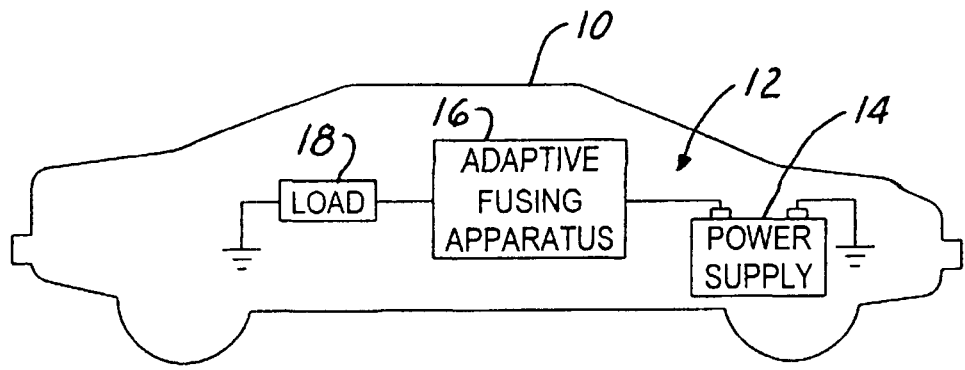
FIG. 1 is a block diagrammatic view of a vehicle using an adaptive fusing electrical circuit in accordance with an embodiment of the present invention.

In the following figures the same reference numerals are used to refer to the same components. Also in the following description, various operating parameters and components are described for one constructed embodiment. These specific parameters and components are included as examples and are not meant to be limiting.

While the present invention is described with respect to a method and apparatus of adaptive fusing for a 42V electrical circuit within a vehicle, the following method is capable of being adapted for various purposes and is not limited to the following applications and electrical systems: vehicle circuits, residential systems, commercial systems, communication systems, or other electrical circuits and systems that need adaptive fusing.

Referring now to FIG. 1, a block diagrammatic view of a vehicle 10 using an adaptive fusing electrical circuit 12 in accordance with an embodiment of the present invention is shown. The circuit 12 is a series circuit, which includes a 42V power supply 14. Supply 14 although described as a 42V power supply may be of various voltage levels. The supply 14 may be, but is not limited to one of the following: a motor, a generator, a vehicle voltage bus, or other resistive or inductive power supplying source. Supply 14 transfers electrical current to the adaptive fusing apparatus 16. The adaptive fusing apparatus 16 monitors the current transfer through the circuit 12. The current transferred through the apparatus 16 is drawn by the load 18. The load 18 may be any vehicle component that uses electrical power.

Figure 2:
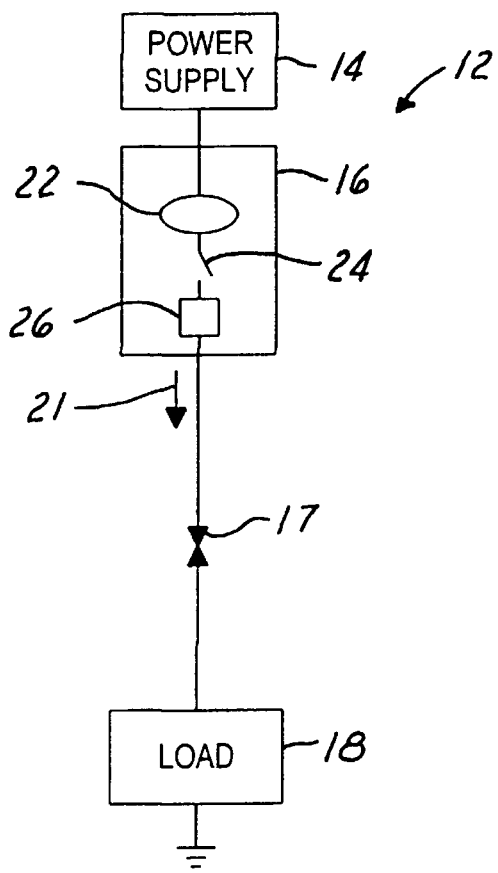
FIG. 2 is a schematic view of an adaptive fusing apparatus applied in a series arc according to an embodiment of the present invention.

Referring now to FIG. 2, a schematic view of an adaptive fusing apparatus 16 applied in a series circuit 12 according to an embodiment of the present invention is shown. Electrical current represented by arrow 21 is transferred from supply 14 through the adaptive fusing apparatus 16 and electrical contacts 17 to the load 18. One skilled in the art would recognize that load 18 may be either a resistive or inductive load.

The apparatus 16 has a controller 22 in series with an interrupt switch 24. The switch 24 has a closed state and an open state. The controller 22 opens switch 24 when predetermined conditions are met. The switch 24 is used to selectively allow current to be drawn from load 18. Although, the present invention is described with regards to a switch 24, one skilled in the art would realize that the present invention might be applied to any electrical component that may produce arcing, such as a motor or resistive load. The switch 24 is also in series with a current sensor 26. The current sensor 26 measures current transferred through circuit 20.

The controller 22 may be of various style and type and is not limited to one of the following: microprocessor or signal processor, and a series of logic devices. The switch (breaker) 14 is an electromechanical relay, an active device such as a MOSFET, or other electronic control device. The controller 22 of the present invention has RAM, EEPROM, or flash memory for storing values associated with guard bands. In general, a guard band is a determined range with an upper boundary and a lower boundary. The upper and lower boundaries may be a single constant or continuous value or may be a varying set of values that are measured over time. A determined range is related to a circuit parameter selected from the following list: current, duration of current, voltage, temperature, resistance, frequency, amplitude, inductance, impedance, or other electrical or mechanical parameter. The determined range may be predetermined or may be adaptively created or changed during vehicle 10 operation. Each electrical device in circuit 12 has its own characteristics which are related to the above mentioned parameters. Controller 22 is capable of learning the duration of short arcs during switch closure or opening, and any brush-arcs during the operation of dc-motors, so as to protect against a false trip. The usual current decay rates when turning-off an inductive load via a switch are also learned. Since the current pass through the circuit 12 is being monitored, any over-current condition is easily detectable.

Figure 3:
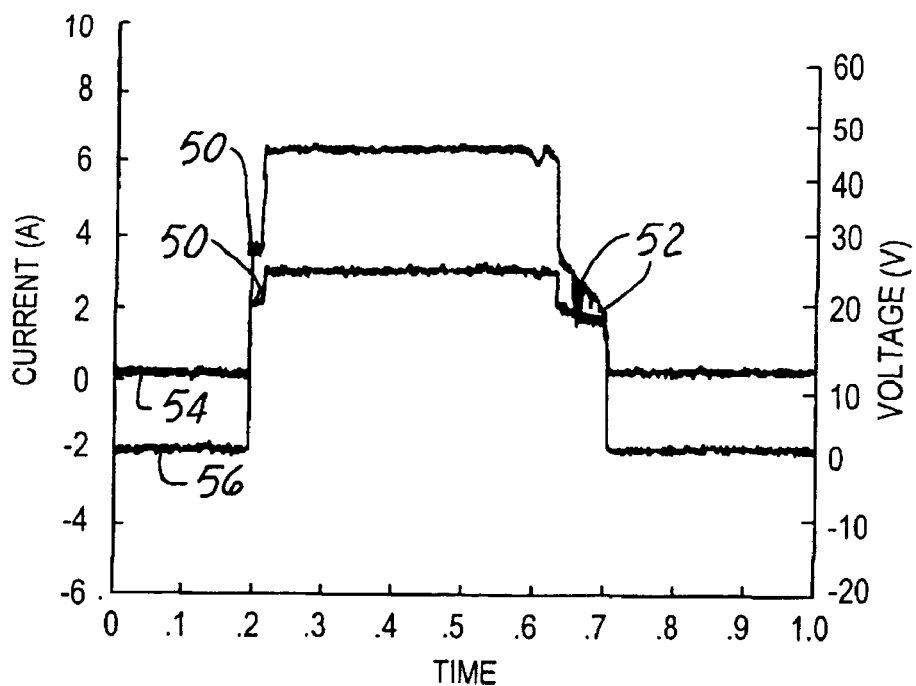
FIG. 3 is a graph of current versus time showing a typical MAKE arc and a typical BREAK arc for a 42V system.
Figure 4:
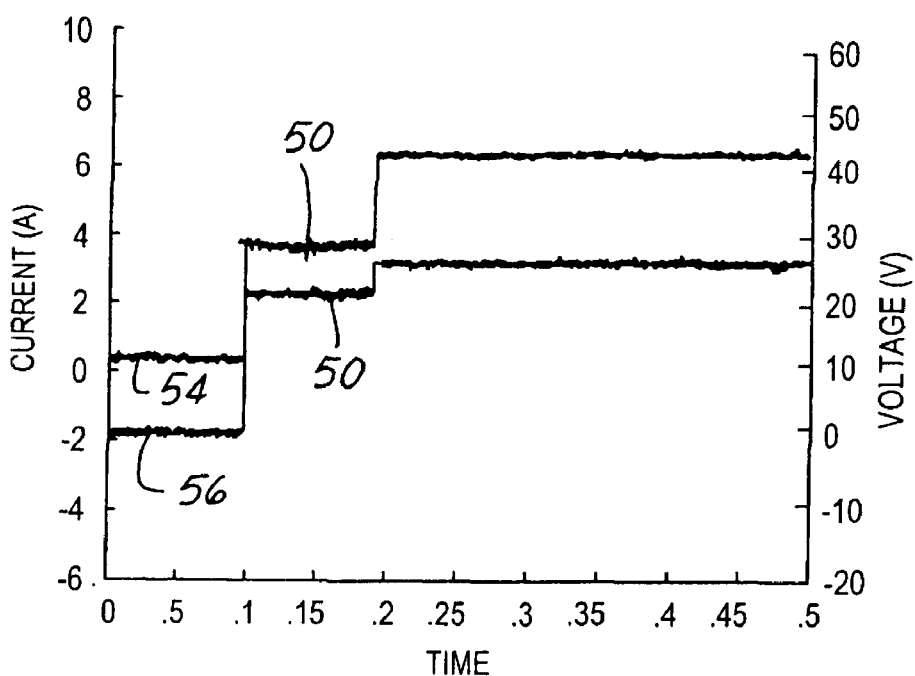
FIG. 4 is an enlarged view of a portion of the MAKE arc of FIG. 3.

Referring now to FIG. 3, a graph of current versus time showing a typical MAKE arc 50 and a typical BREAK arc 52 for a 42V system is shown. Curve 54 represents voltage across load 18 and curve 56 represents current passing through load 18. As electrical contacts 17 are brought together an arc occurs referred to as the MAKE arc 50 as shown as part of curves 54 and curve 56. A close-up view of the MAKE arc 50 is best seen in FIG. 4. As the contacts 17 are separated another arc may occur, which is referred to as the BREAK arc 52 as shown as part of curves 54 and curve 56.

The controller 22 monitors current level, duration of the current level, and frequency information. The current level duration caused by an arc depends on the opening speed of switch 24, the contact surface area present on switch 24, the number of contacts present in switch 24, and arc suppression similar to magnetic blow out. The controller 22 opens switch 24 when the current level and the duration of the current level caused by an arc are outside a first guard band and a second guard band respectively. The present invention also compares a signature of the current information with that of a determined signature, which corresponds to load 18 during normal operation. When the current profile is outside the first guard band and the signature measured is outside an adaptable signature guard band having an upper boundary and a lower boundary the controller opens switch 24 to interrupt the current transfer. A controller 22 also analyzes the frequency spectrum of the signal together with the sudden current bursts and current decay characteristics, and compares its signature to a set of determined arc parameters. Frequency domain analysis detects sudden drops or increases in current and the on set of a showering arc. The aforementioned allows the controller 22 to determine severity of the arc. Depending on the severity and repetition rate, the controller 22 trips switch 24 to the open state, isolating the power to the fault and loads downstream. The controller 22 may also send a signal via a Controller Area Network (CAN) message to a vehicle main computer (not shown) identifying the location of the arc or tripped switch. Identifying the location of the increase in current aids in troubleshooting circuit 12 and may provide information on the severity of the arc.

The controller 22 also includes the fuse-curve characteristics, based on a predetermined percentage increase of the current through the circuit. These characteristics will be actively varied to compensate for both cold and warm temperatures.

In operation, controller 22 learns normal current and arc duration from operating load 18. The controller 22 then establishes a guard band around normal operating parameter levels to prevent any possible nuisance tripping. Controller 22 measures and saves the normal current levels and the normal allowable arc durations for load 18, thereby, allowing it to evaluate whether the arc durations are greater than a maximum allowable arc duration for a particular current level. When this determination proves positive, the controller 22 will interrupt the current 21 by tripping switch 24 to the open state.

The present invention is capable of detecting resistive short circuits which are intermittent, and has the capability of being remotely tripped, for example, by an airbag in the event of a crash, through CAN messaging or via a vehicle voltage bus. A resistive short could happen at various locations in circuit 12. A resistive short may occur in any vehicle component as between contacts on a switch or between unshielded wire or between an unshielded wire and a vehicle's metallic body or a vehicle ground. Another example of when a resistive short may occur is when electrical contacts are pulled apart, sometimes referred to as a "hot swap", in which the current drops suddenly followed by a slow decay rate. The present invention will ensure fast over-current protection, especially when shorts to ground occur, greatly reducing the potential for a hazardous condition. Apparatus 16 is adaptable to any fusing characteristic including; duration of current, fusing amperage, fusing power, or other fusing characteristics, which depends on the load. Normal operational current levels, and normal arc durations due to resistive and inductive load operation are included within the apparatus 16 for circuit 12. Each of these parameters have a designated guard band so as to prevent nuisance trips, while at the same time prevent extended arcs that could potentially cause an undesirable or hazardous condition.

An inductive load has a smooth or extended decay rate rather than a sudden increase in current level as with resistive loads, which signify a problem in operation. The controller 22 may have an algorithm, which depends primarily on the current and the current duration of an arc as to detect problems in inductive load operation. The algorithm would perform a time domain analysis to determine the onset and duration of the sustained arc. Frequency domain analysis may also be performed to determine the onset of a showering arc. A sustained arc may occur during the time when load 18 is not drawing power as in the case of a parallel arc. The sustained arc does not show a change in frequency from any normal operation. So if the short occurs in a controlled fashion, there is a possibility that the sustained arc could be present for a relatively long period without any high frequency component. For this reason, the time-domain analysis with detection of the rate of decay of current will be sufficient to detect the sustained arc. A sustained arc may also occur when load 18 is drawing power as in the case of a series arc. When load 18 is drawing power the current 21 may have varying amplitude and frequency even though the current is decaying over time, therefore the frequency domain analysis would be used.

Figure 5:
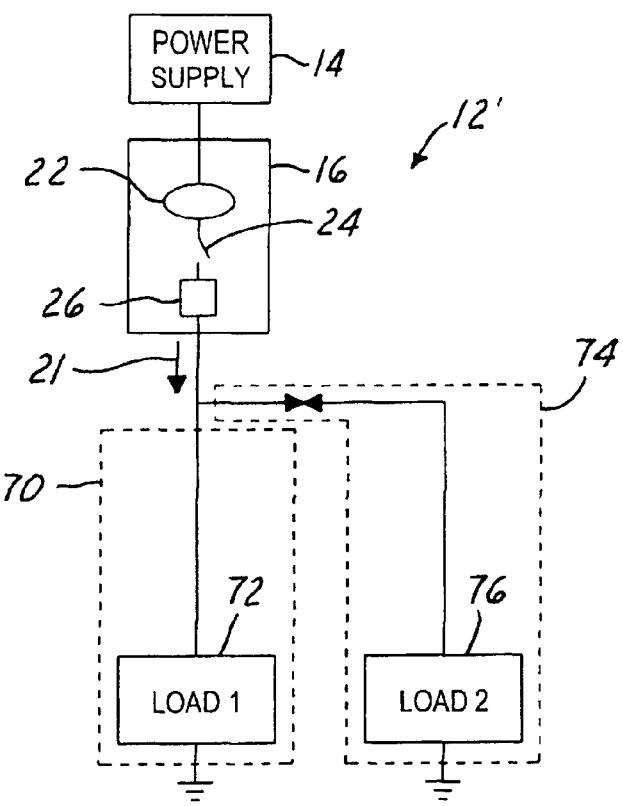
FIG. 5 is a schematic view of an adaptive fusing apparatus applied in a parallel arc according to an embodiment of the present invention.

Referring now to FIG. 5, a schematic view of an adaptive fusing apparatus 16 applied in a parallel arc 12" according to an embodiment of the present invention is shown. The apparatus 16 transfers current 21 to a first parallel path 70 having a first load 72 and to a second parallel path 74 having a second load 76. Although, the contacts 17 are shown as part of the second parallel path 74 they may be located anywhere in circuit 12". The controller 22 opens switch 24 when current is outside guard bands determined for the first parallel path 70 and the second parallel path 74.

Figure 6:
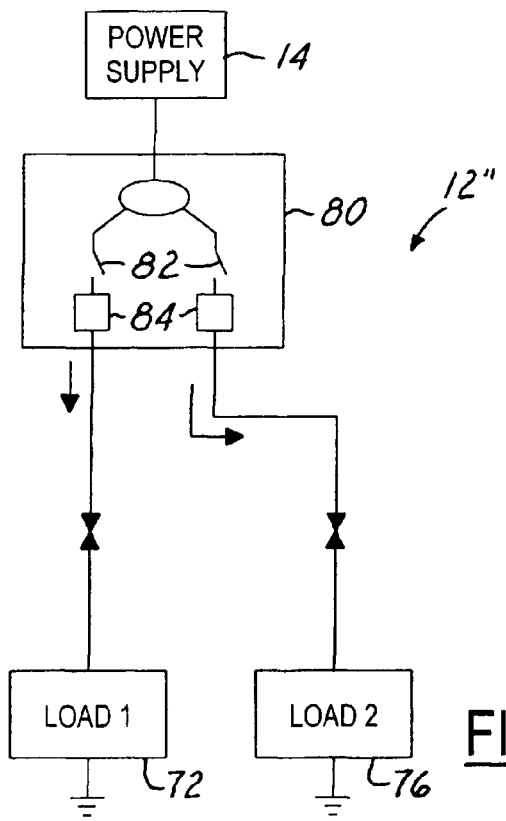
FIG. 6 is a schematic view of a dual adaptive fusing apparatus applied in a parallel circuit according to an embodiment of the present invention.

Referring now to FIG. 6, a schematic view of a dual adaptive fusing apparatus 80 applied in a parallel circuit 12"" according to an embodiment of the present invention is shown. The apparatus 80 may have multiple interrupt switches 82 and current sensors 84 providing the ability to interrupt current from being transferred to either the first load 72 or the second load 76. Although, circuit 12"" is illustrated as having two interrupt switches 82 and two current level sensors 84 any number of switches or current level sensors may be used in conjunction with additional loads. A message may be sent to a vehicle main computer (not shown) identifying a path where the increase in current level occurred.

Figure 7:
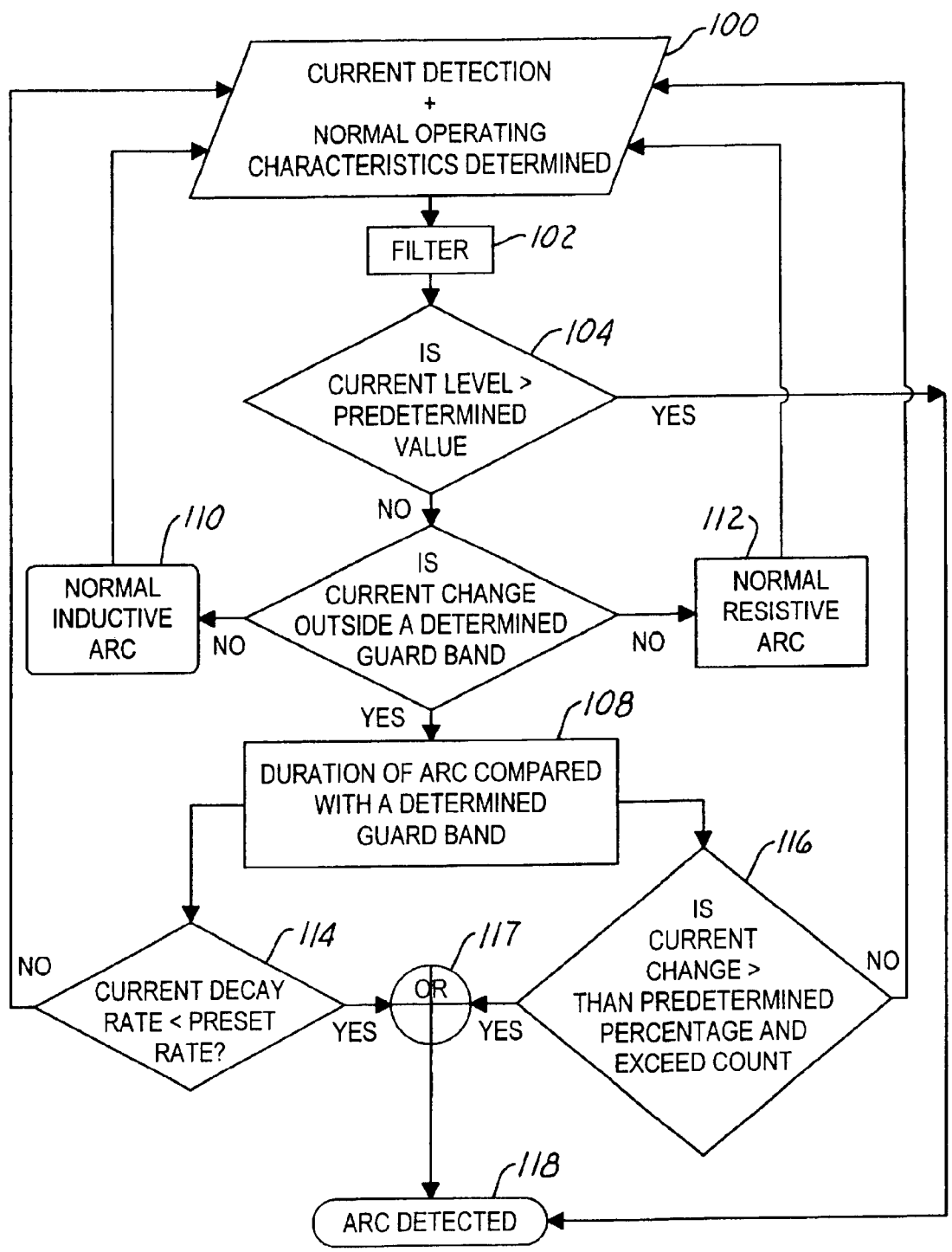
FIG. 7 is flow chart illustrating an adaptive fusing technique according to an embodiment of the present invention.

Referring now to FIGS. 2 and 7, a flow chart illustrating an adaptive fusing technique according to an embodiment of the present invention is shown.

In step 100, electrical current 21 is measured using sensor 26 and normal operating characteristics are determined. The normal operating characteristics include: load profile, current levels, duration of current levels, voltage levels, power consumption, frequency information, and other measurable operating characteristics of the circuit 12. All the measured values are transferred via measured signals to the controller 22.

In step 102, the measured signals are filtered using a low pass filter. The filter may be a noise filter, an anti-aliasing, or other filter know in the art.

In step 104, the current change is compared with a predetermined value. The predetermined value represents a value at which a short to ground has occurred. When the current level is greater than the predetermined value step 118 is performed otherwise step 106 is performed.

In step 106, the current level is compared to a determined guard band. When the current level is outside the determined guard band step 108 is performed otherwise either step 110 or 112 is performed. When the current level is similar to a resistive normal operation level step 112 is performed. When the current level is similar to an inductive normal operation level step 110 is performed.

In step 110 and 112, the controller 22 determines that circuit 12 is operating in normal mode and returns back to step 100. The severity of the arc may be considered in conjunction with other parameters. When the controller 22 determined the severity of the arc and the parameters considered are outside determined guard bands step 118 is performed.

In step 108, the duration of the arc is compared with a determined guard band. When the duration of the current level is outside the determined guard band steps 114 and 116 are executed.

In step 114, the decay rate of the current is compared to a preset or determined value. When the decay rate is less than the preset value step 118 is performed after passing through the logic "OR" gate 117 otherwise the controller 22 returns to step 100.

In step 116, when change in current level is greater than a predetermined percentage and number of occurrences exceeds a preset count step 118 is performed after passing through the logic "OR" gate 117 otherwise the controller 22 returns to step 100.

In step 118, an arc has been detected. The controller 22 interrupts the current 21 in circuit 12 to prevent degradation of electrical components and potential hazardous conditions from occurring.

The present invention thus achieves an improved and reliable adaptive fusing system by learning the duration of changes in current in combination with other parameters as compared with those in normal operation. In this way, the present invention is capable of interrupting a circuit during an arc while minimizing false tripping. Additionally, the present invention is capable of adapting to the load conditions of which it is protecting.

The above-described method, to one skilled in the art, is capable of being adapted for various purposes and is not limited to the following applications: vehicle circuits, residential systems, commercial systems, communication systems, or other electrical circuits and systems that need adaptive fusing. The above-described invention may also be varied without deviating from the true scope of the invention.

What is claimed is:

1. An adaptive fusing electrical circuit including a power supply and an electrical load comprising:
   a current detector measuring a current level through the electrical circuit;
   an interruption switch electrically coupled to the electrical load and said current detector having an open state and a closed state, said interruption switch normally closed; and
   a controller electrically coupled to the power supply, said current detector, and said switch, said controller monitoring said current level and a first circuit parameter of the electrical circuit;

said controller having a first guard band corresponding to said current level and a second guard band corresponding to said first circuit parameter, wherein said controller comparing said current level to said first guard band and said first circuit parameter to said second guard band and switching said interruption switch from said closed state to said open state when said current level is outside said first guard band and said first circuit parameter is outside said second guard band.

2. A circuit as in claim 1 further comprising an adaptive fusing apparatus comprising said controller and said interruption switch.

3. A circuit as in claim 2 wherein said adaptive fusing apparatus measures, monitors, and interrupts resistive shorts in the adaptive fusing electrical circuit.

4. A circuit as in claim 2 wherein said adaptive fusing apparatus measures, monitors, and interrupts current to an inductive load in the adaptive fusing electrical circuit.

5. A circuit as in claim 2 wherein said adaptive fusing apparatus further comprises said current detector.

6. A circuit as in claim 1 wherein said parameter is selected from a group comprising: duration of current amplitude, frequency, time, temperature, voltage, power, inductance, and resistance.

7. A circuit as in claim 1 wherein said controller further comprises a memory device storing said first guard band and said second guard band.

8. A circuit as in claim 7 wherein said memory device further stores signal curve characteristics corresponding to a electronic device and said controller controlling said interruption switch to switch from said closed state to said open state when said signal curve characteristics are outside a predetermined signal curve guard band.

9. A circuit as in claim 8 wherein said controller creates a guard band in response to a set of measured parameters and electronic device characteristics.

10. A circuit as in claim 1 wherein said controller measures a large current surge caused by a short to ground and controls said interruption switch to switch from said closed state to said open state directly upon measuring said large current surge.

11. An adaptive fusing electrical circuit including a power supply and first electrical load and a second electrical load comprising:

a first current detector measuring a first current level through the electrical circuit;

a second current detector measuring a second current level through the electrical circuit;

a first interruption switch electrically coupled to the first electrical load and said first current detector having an open state and a closed state;

a second interruption switch electrically coupled to the second electrical load and said second current detector having an open state and a closed state; and a controller electrically coupled to the power supply, said first current detector, said second current detector, and said switch, said controller monitoring a first current level, a second current level, a first circuit parameter, and a second current parameter of the electrical circuit;

said controller having a first guard band corresponding to said first current level, a second guard band corresponding to said second current level, a third guard band corresponding to said first circuit parameter, and a forth guard band corresponding to said second circuit parameter;

said controller comparing said first current level to said first guard band and said first circuit parameter to said third guard band switching said first interruption switch from said closed state to said open state when said first current level is outside said first guard band and said third circuit parameter is outside said second guard band;

said controller comparing said second current level to said second guard band and said second circuit parameter to said forth guard band switching said second interruption switch from said closed state to said open state when said second current level is outside said second guard band and said second circuit parameter is outside said forth guard band.

12. A circuit as in claim 11 further comprising an adaptive fusing apparatus comprising said first interruption device and said second interruption device.

13. A circuit as in claim 11 further comprising an adaptive fusing apparatus comprising said first current detector and said second current detector.

14. A method of adaptive fusing for an electrical circuit having an electrical load drawing an electrical current therethrough comprising:

measuring a current level and a circuit parameter;

comparing said current level with a first guard band and said circuit parameter with a second guard band; and interrupting said electrical current when said current level is outside said first guard band and said circuit parameter is outside said second guard band.

15. A method as in claim 14 further comprising:

analyzing frequency information of said electrical current;

interrupting said electrical current when said frequency information is outside a predetermined frequency response range and said current level is outside said first guard band.

16. A method as in claim 14 further comprising:

learning normal operating characteristics of an electronic device; and creating a guard band in response to those characteristics.

17. A method as in claim 16 wherein learning normal operating characteristics includes characteristics selected from the following group comprising: load profile, operating current levels, operating voltage levels, operating power levels, operating temperature levels, current decay rates.

18. A method as in claim 17 wherein interrupting said electrical current when said operating characteristics are outside corresponding guard bands determined for those operating characteristics.

19. A method as in claim 14 wherein measuring a circuit parameter comprises measuring a parameter selected from the following group comprising: duration of current amplitude, frequency, time, temperature, voltage, power, inductance, and resistance.

* * * * *